United States Patent [19]
Nagel et al.

[11] 4,058,684
[45] Nov. 15, 1977

[54] APPARATUS FOR DIRECT LINE SWITCHING

[75] Inventors: Artur Nagel, Deurle; Roland Wissaert, Drongen, both of Belgium

[73] Assignee: Siemens Aktiengesellschaft, Munich, Germany

[21] Appl. No.: 625,868

[22] Filed: Oct. 28, 1975

[30] Foreign Application Priority Data

Oct. 25, 1974 Germany .............................. 2450870

[51] Int. Cl.² ............................................. H04M 3/42
[52] U.S. Cl. ................................................ 179/18 BB
[58] Field of Search ..................................... 179/18 BB

[56] References Cited

U.S. PATENT DOCUMENTS 3,328,533  6/1967  Vaccaro et al. ................. 179/18 BB

FOREIGN PATENT DOCUMENTS 2,006,552  8/1971  Germany ......................... 179/18 BB Primary Examiner—William C. Cooper
Attorney, Agent, or Firm—Schuyler, Birch, Swindler, McKie & Beckett

[57] ABSTRACT

Apparatus is described for use in centrally controlled telecommunication switching systems having direct line service facilities. A direct line key, via a direct line repeater, is directly connected to a specified direct line station. Through operation of an exchange key, e.g., at a switchboard, the link connecting process to the direct line station is begun using a connecting path which is ready for seizure.

1 Claim, 1 Drawing Figure

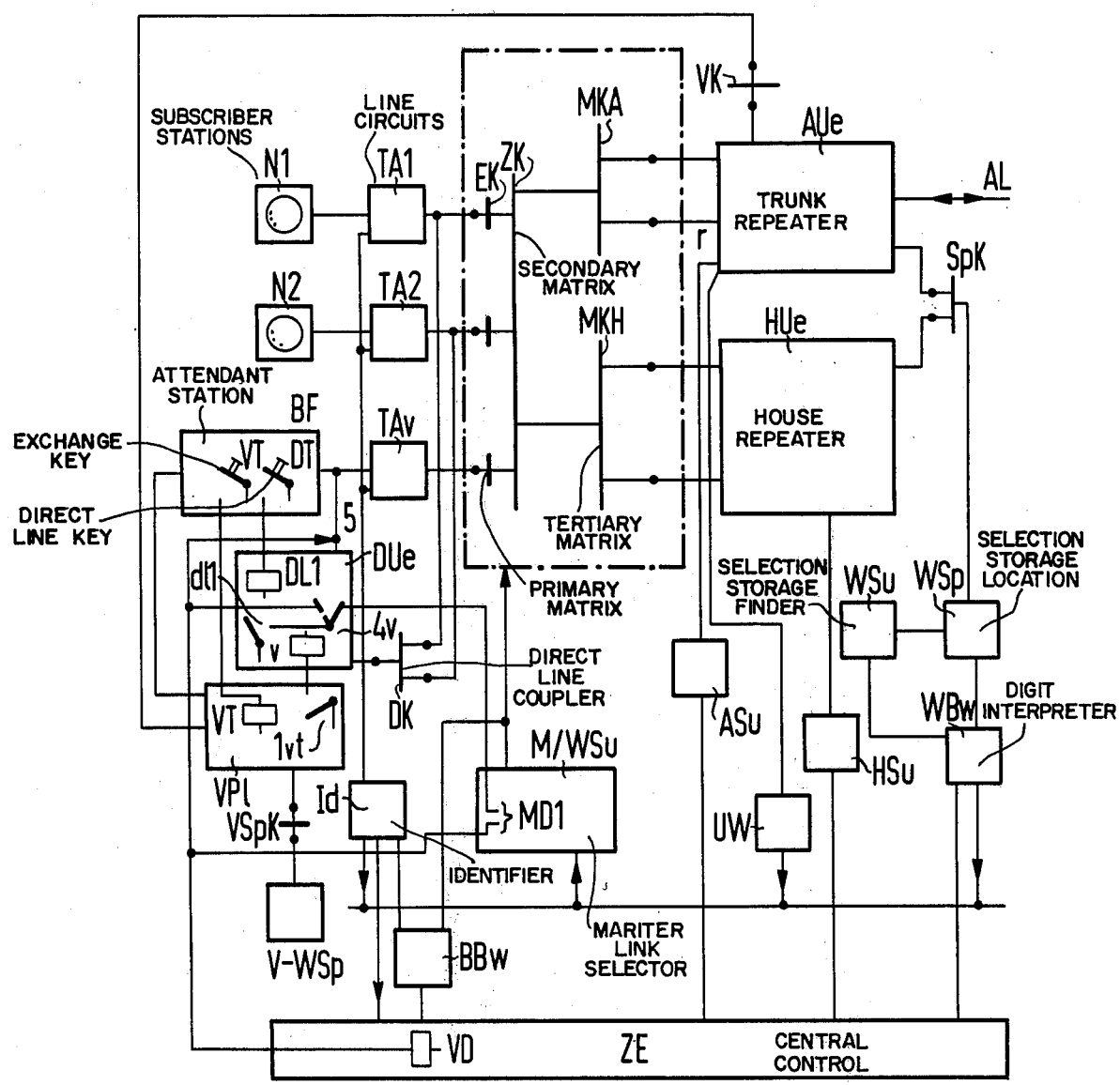

APPARATUS FOR DIRECT LINE SWITCHING

BACKGROUND OF THE INVENTION

This invention relates to a switching arrangement for a telecommunication system. The invention is particularly useful with a private automatic telephone branch exchange. The system in question is equipped with central control equipment and identifier, as well as with direct line service facilities, wherein an exchange through operation of a direct line key via a direct line repeater is connected to a specified direct line station over a direct connecting path. In such exchanges, through operation of an exchange key the link connecting process to the direct line station over a connecting path which is ready for seizure is begun.

In the prior art, a circuit arrangement has been suggested wherein, in, for example, a private automatic telephone branch exchange with direct line facilities, an exchange is connected to a specified hot line station through operation of a direct line key via a direct line repeater over a direct connecting path. In exchanges of this type, through operation of an exchange key a link connecting process to the direct line station over a connecting path is begun. The latter connecting path is also ready for seizure for internal connections, in that the exchange, upon operation of the exchange key, causes, through subsequent operation of the direct line key over an appropriate jumper wire, the direct marking of the direct line station in the marker. In this system, an additional expenditure is necessary in order to prevent the switching of the direct line connection and for patching to the marker for the purpose of marking the station to be connected to the operator's position.

It is an object of the present invention to provide, with minimum additional expense the switching of connecting paths between an operator's position and a direct line station, making use of the existing switching equipment.

SUMMARY OF THE INVENTION

In accordance with the invention, the foregoing and other objects are achieved in that through the operation of a direct line key following the operation of the exchange key, switching means controlling a direct line program request connect the direct route through to the direct line subscriber station, such that a subscriber signalling relay assigned to the direct line subscriber station is energized by a signal generated by the central control unit over the completed connection path. The direct line station is subsequently identified. Using the identified switching condition and the identifier information, a switching operation from the direct line connection to a connecting path to the switchboard is controlled over the switching stages and connecting paths. These connecting paths are ready for seizure for internal connections, as well.

In this way, by utilizing the connected direct route the direct line subscriber station can be identified simply and the switching-through of the connection between the exchange and the direct line subscriber station to a connecting path and switching stages can be effected with only little additional expense. Also, in this way with an existing switching connection between the direct line subscriber station and the exchange one can simply switch the connection to the direct line subscriber station waiting to be served.

BRIEF DESCRIPTION OF THE DRAWING

A preferred embodiment constructed according to the principles of the invention is described hereinbelow. The single FIGURE drawing is a schematic diagram of that embodiment.

DETAILED DESCRIPTION OF THE PREFERRED EMBODIMENT

The drawing illustrates the connection of a station N1 or attendant's telephone BF over a primary matrix EK, secondary matrix ZK and tertiary MKH with a free repeater, after identification by an identifier Id under the control of a central control unit ZE, a marker and a link selector M/WSU. A free register WSp is subsequently connected by the selection storage finder WSu, and the path to the desired subscriber station N2 is established with the aid of a digit interpreter WBw and the central control unit ZE. The construction and operation of the foregoing devices are well known and are, therefore, not described herein (Cf. U.S. Pat. No. 3,242,266).

The transfer to a trunk repeater occurs in a manner in itself known after the dialing of an exchange code. Incoming trunk calls are switched through to the desired extension via the trunk tertiary matrix MKA, the secondary matrix ZK and the primary matrix EK. Trunk line calls coming in at the operator's position are through-connected by intiating from the operator's position the marking of the trunk repeater and of the called subscriber.

If in the system shown a subscriber wants to establish a connection over a special direct line to the operator after the operation of the direct line key an appropriate switchboard indicator light is turned on. By operating the exchange call-circuit key at the attendant's console or operator's desk, the calling direct line subscriber is connected via operated DL/DK contacts to the direct line repeater, and that subscriber receives a call signal. Upon removal of the receiver, the subscriber is connected to the exchange via the direct line coupler. A subscriber station is assigned as many direct line keys as connections may be established from there to different subscribing stations having the direct connection capability.

The systems described hereinabove are designed to simplify the switching of incoming exchange line calls, i.e., calls between a PABX subscriber and a station connected to a public exchange. Heretofore, incoming exchange line calls have been set up in that the operator gains access to the exchange trunk by operating a request key in order to answer the subscriber of a public exchange, who is connected with a selection storage by operation of an exchange key for the acceptance of pulsing signals for the purpose of establishing an internal connection.

If it is assumed that there is an incoming exchange call over the exchange trunk and, either because of the dialing of a station code, or because the called station of the PABX does not answer within a specified time period, or because the desired station is busy, the incoming exchange call is signaled at the operator's position. Then the operator is able to gain access to the outgoing portion of the trunk repeater and of the speech path, i.e., to the exchange trunk, for the purpose of answering the incoming exchange call. If because of this answering, a connection must be switched to a station of the PABX, this switching may be begun in a manner in itself known by operating exchange key VT. By operating this key, the connection to the exchange portion of the speech path in the trunk repeater is begun in a manner in itself known and not shown herein. As a rule, the exchange would now have to dial the complete code of the desired station. In the present case, however, since the desired station is, for example, a direct line subscriber station, relay DL1 in the hot line repeater is actuated by operating the direct line key DT. In this way, the direct line connection is switched to the desired station (e.g., station N1) via direct line coupler DK in a manner in itself known and not shown herein. Subscriber line circuit TA1 is also provided in this through-connecting path.

Since the exchange key was actuated prior to the operation of the direct line key and, hence, at the operator's position the relay VT is actuated with the contact 1vt, relay V in the direct line repeater is energized, and through operation of the contact 3d11 via the operated contact 4v, an identification alterting signal is applied over the connected direct line route in the manner indicated above over the existing connecting path between attendant's telephone BF and the wires 5 shown symbolically, as well as to the direct line coupler to the station N1. As a result, for example, the subscriber signalling relay on one of the speech wires or on an auxiliary wire is turned on if the subscriber relay is not yet energized, thereby causing in a manner in itself known the identification of the station.

As a result of the identification and the marking of the switching condition in the direct line repeater by relay VD in the central control unit, this identification result is used by the central control unit to identify, through the trunk repeater finder, the trunk repeater connected by the coupler VK to the operator's position and, hence, also to the attendant's telephone. By means of both identification results from the marker and from the link finder M/SWu, a connection between the trunk repeater and the identified station N1 is established over the connecting path, which is likewise normal for internal connections and runs over the primary matrix, the secondary matrix and the trunk tertiary matrix.

Thus, with a minimum of additional expense, i.e., practically only with one additional relay per hot line repeater and a single relay in the central control unit, the switching through from the direct line connection to the normal connecting path may be effected over the existing switching stages.

The preferred embodiment described hereinabove is intended only to be exemplary of the principles of the invention. It is contemplated that it can be modified or changed in a variety of ways known to those skilled in the art while remaining within the scope of the invention as defined by the appended claim.

We claim:

1. In a telecommunication system having subscriber stations, an operator station, a central control, identifier means, normal switching network means for completing connections within the system via internal repeater means and without the system via trunk repeater means and a direct line switching network for direct line connections of subscriber stations having the direct connection capability to direct line coupling means, said operator station having exchange key means for connecting said operator station to said trunk repeater and direct line key means for marking and identifying direct line subscriber stations and means responsive thereto for connecting the operator with the corresponding direct line subscriber station via said direct line coupling means, the improvement comprising:

identifying means operable responsive to actuation of said exchange key means and said direct line key means for marking and identifying in said direct line coupling means said direct line subscriber station to which an incoming call from said trunk repeater means is to be connected and switching means operable responsive to the result of the operation of said identifying means for forming a normal connection path between said trunk repeater means and said direct line subscriber station to which the incoming call is to be connected.

* * * * *